US008002445B2

(12) United States Patent
Tachino et al.

(10) Patent No.: US 8,002,445 B2
(45) Date of Patent: Aug. 23, 2011

(54) LED LUMINAIRE WITH AUTOMATIC LUMINANCE COMPENSATION

(75) Inventors: Youji Tachino, Tsubame (JP); Koji Yamashita, Yawata (JP)

(73) Assignee: Panasonic Electric Works Co., Ltd., Osaka (JP)

( * ) Notice: Subject to any disclaimer, the term of this patent is extended or adjusted under 35 U.S.C. 154(b) by 156 days.

(21) Appl. No.: 12/548,220

(22) Filed: Aug. 26, 2009

(65) Prior Publication Data

US 2010/0109439 A1 May 6, 2010

(30) Foreign Application Priority Data

Aug. 26, 2008 (JP) .................................. 2008-217428

(51) Int. Cl.
*F21V 7/00* (2006.01)
(52) U.S. Cl. .......... 362/343; 362/344; 362/276; 362/20; 315/294; 307/66
(58) Field of Classification Search .................. 362/341, 362/343, 344, 276, 802; 307/66; 315/294; 428/670; 257/670
See application file for complete search history.

(56) References Cited

U.S. PATENT DOCUMENTS

| 5,521,432 A * | 5/1996 | Tsuji et al. ..................... 257/677 |
| 2004/0043668 A1* | 3/2004 | Ikuta ............................. 439/668 |
| 2005/0017380 A1* | 1/2005 | Namespetra et al. ........... 261/75 |

FOREIGN PATENT DOCUMENTS

| JP | 2001-014909 | 1/2001 |
| JP | 2004-039289 | 5/2004 |
| JP | 2007109915 | 4/2007 |
| JP | 2008-098190 | 4/2008 |

* cited by examiner

*Primary Examiner* — Ali Alavi
(74) *Attorney, Agent, or Firm* — Waddey & Patterson; Mark J. Patterson

(57) ABSTRACT

An LED luminaire for normal or emergency lighting has a lamp section comprising a least one LED lamp, the LED lamp having an LED chip and a reflector section. The reflector section is formed of silver and is positioned to reflect light from the LED chip. A power section is coupled to supply power to the lamp section. A detector section has a silver-plated detector and is functional to detect sulfuration of the reflector section as a resistance value change. The power section is operable to adjust the power supplied to the lamp section upon detecting an increase in the resistance value at the silver-plated detector of the detector section.

4 Claims, 5 Drawing Sheets

LED LUMINAIRE WITH AUTOMATIC LUMINANCE COMPENSATION

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit of the following patent application(s) which is/are hereby incorporated by reference: Japanese Patent Application No. 2008-217428, filed Aug. 26, 2008.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates generally to luminaires. More particularly, the present invention pertains to LED luminaires used as a source of normal and emergency lighting.

There are conventional luminaires, such as internally illuminated emergency, directional or pathway guide lights, that are provided with a box-shaped fixture main body whose front side is opened. A lamp such as a cold cathode lamp is arranged within the fixture main body. A ballast or other source of operating power is accommodated within the fixture main body to power the lamp, and a display panel is attached on a front side of the fixture main body so as to cover the open portion.

However, such conventional luminaires require a high-voltage, high-frequency voltage to be applied between the electrodes of the cold cathode lamp in order to power and operate the cold cathode lamp as the light source. Therefore, the wires connecting the ballast to the cold cathode lamp decrease the power supplied to the cold cathode lamp because of the influence of a stray capacitances. This may decreases the light output of the cold cathode lamp, so that some efforts are necessary to make the wiring as short as possible.

Because the cold cathode lamp requires a high voltage to operate, the ballast must be shut off entirely to avoid accidents such as electric shock when an abnormality occurs in the lamp. The cold cathode lamp thus cannot be lit even at the time of disaster such as a power outage. In the case where the luminaire is operated by means of, for example, a remote control device so as to check circuit operation of the luminaire, the remote control may malfunction because of noise generated from the cold cathode lamp.

Other luminaires are conventionally offered which use a plurality of lamps having LED chips as a light source. In this embodiment, the luminaire powers a plurality of LEDs using a DC power source, such as a battery, having a variable power output. A switching element and a plurality of lamps are connected in series with the DC power source to control the switching element so that the current applied to the lamp becomes constant, thereby enabling the lamp to be lit with stability.

Further, such conventional luminaires, when used as an emergency guide light, use a lamp having an LED chip as a light source, so that the lamp can be powered by a lower voltage compared to a luminaire using a cold cathode lamp as a light source. It is thus not necessary to shut off the power circuit entirely to avoid accidents such as electric shock during a power outage, thereby realizing continuous lighting. The lamp also can be driven by a low-voltage DC power source, so that the noise effects can be relatively reduced.

Some prior art LED luminaires are provided with a reflector section made of silver with a high reflection efficiency. The reflector section is arranged around a blue LED chip including a GaN compound semiconductor, positioned at the bottom of an LED package. A translucent resin (such as a silicone resin) containing a yellow phosphor is filled within the package. This provides energy savings.

In the prior art luminaire described above, sulfur that penetrates the translucent resin reacts with the silver in the reflector section to generate silver sulfide on the surface of the reflector section. This blackens the surface of the reflector section, thereby deteriorating luminance flux by approximately 20% to 30%, depending on an amount of silver used in the reflector section. Moreover, since the amount of free sulfur varies depending on the usage of the luminaire, it is difficult to predict when the surface of the reflector section of the lamp will be blackened.

When the luminaire is used as a guide light in Japan, the standards for guide luminaires and escape guide systems of the Japan Luminaires Association must be complied with. The guide lights are classified according to a size of a display surface. For example, in an escape exit guide light and a route guide light, a luminaire having a display surface of 130 mm or more and less than 200 mm in length falls into Class C. A luminaire having a display surface of 200 mm or more and less than 400 mm in length falls into Class B. Class B is subdivided into Class B Type BH that has relatively high average brightness of the display surface, and Class B Type BL that has relatively low average brightness. Furthermore, for example, in the Class B Type, the average brightness of the display surface is defined for the escape exit guide light and the route guide light in both normal operation and in an emergency, respectively, as shown in FIG. 6.

In the prior art luminaires that use an LED light source, approximately 30% of luminous flux deterioration occurs due to the degradation of the translucent resin at lamp end of life. It would appear that the sulfuration of the surface of the LED reflector section causes about 20% of the luminous flux degradation at the beginning of lamp use. More specifically, in this luminaire, it would appear that approximately 50% of the luminous flux degradation at the beginning of use occurs at the end of life of the LED.

In addition, in the case where the luminaire described above is used as an escape exit guide light of Class B Type BH, it would appear that the average brightness of the entire display surface at the end of life of the lamp is set to a lower limit in JIL5502 (500 $cd/m^2$), considering the luminous flux deterioration of the lamp due to the sulfuration of the surface of the reflector section.

In this case, however, the average brightness at the beginning of use is $500/(1-0.5)=1000$ $cd/m^2$, if considering the luminous flux deterioration due to the degradation of the translucent resin filled within the package. Therefore, the average brightness at the beginning of use exceeds 800 cd//m² that is the upper limit in JIL5502, so that the average brightness cannot satisfy JIL5502.

Referring to FIG. 7, a conventional prior art luminaire is provided with a box-shaped package 11a'' including a concave portion 11j'' in a circular shape (in plan view) formed on a surface side. A pair of metallic electrodes 11e'' are made of silver and are arranged at the bottom inside of the package 11a''. An LED chip 11b'' is arranged within the package 11a'', die-bonded on one of the metallic electrodes 11e'' by solder or the like, and electrically connected to the other metallic electrode 11e'' via a bonding wire 11i''. A translucent resin layer 11d'' made of a polythiol curing epoxy resin having translucency is filled within the package 11a''. A protection film 11f'' made of silicon nitride is formed on the surface of the translucent resin 11d'' side of the metallic electrodes 11e'' for suppressing the generation of silver sulfide. An exposed portion around the LED chip 11b'' at the bottom inside of the package 11a'' out of the metallic electrodes 11e'' constitutes a reflector section 11c'' for reflecting light emitted from the LED chip 11b''.

However, again referring to FIG. 7, there is a reliability problem when prior art luminaires 11'' use a protection film 11f'' made of silicon nitride and the like on a surface 11c'' of the LED reflector section.

BRIEF SUMMARY OF THE INVENTION

In view of the foregoing, it is an object of the present invention to reduce degradation of luminous flux from a luminaire or lamp fixture caused by luminous flux deterioration in an LED package having an LED chip and a reflector section made of silver that reflects light from the LED chip.

To achieve the object described above, a first aspect of the present invention is characterized by including a lamp section using a lamp having an LED chip and a reflector section made of silver that reflects light from the LED chip as a light source. A power section supplies power to the lamp section. A detector section having a silver-plated detector detects sulfuration of the reflector section as a resistance value change, so that the power section increases the power supplied to the lamp section when an increase in the resistance value is detected at a silver-plated detector in the detector section.

According to the present invention, the power section upwardly adjusts the power supplied to the lamp section increase when an increase in the resistance value is detected at the silver-plated detector in the detection section, thereby compensating the luminous flux deterioration of the lamp. Therefore, it is possible to minimize a decrease in luminous flux emitted from the luminaire due to the luminous flux deterioration of the lamp generated when the reflector section reacts with sulfur, causing the inside of the lamp to sulfurize and blacken.

A second aspect of the present invention is characterized in that, in the first aspect of the present invention, the silver-plated detector is placed within the lamp, and two detection terminals are connected to the silver-plated detector in the lamp.

According to an embodiment of the present invention, the silver-plated detector placed within the lamp reduces a difference in sulfidity between the silver-plated detector and the surface of the reflector section, thereby enabling more accurate compensation of luminance flux. Further, no attachment member is required for attaching the silver-plated detector to the luminaire, so that the cost can be reduced by reduction in component count. It is also possible to avoid the labor cost of attaching the silver-plated detector to the luminaire.

A third aspect of the present invention is characterized in that, in the second aspect of the present invention, the silver-plated detector has a reflection function for reflecting light from the LED chip.

According to one aspect of the present invention, the silver-plated detector has a reflection function for reflecting the light from the LED chip, which can improve efficiency and enabling energy savings.

A fourth aspect of the present invention is characterized, in the first to third aspects of the present invention, by including a display panel to allow light emitted from the lamp section exit from a display surface side, and a battery back-up section to supply power to the power section. The power section is provided with a normal lighting circuit that receives power supplied from a commercial power source to power the lamp section and an emergency lighting circuit that receives power supplied from the battery back-up section to power the lamp section during a commercial power outage. A power section current regulator controls the normal lighting circuit and the emergency lighting circuit to adjust a magnitude of a current supplied from the normal lighting circuit and the emergency lighting circuit to the lamp section. A charging circuit receives power supplied from the commercial power source to charge the back-up battery. The power section current regulator adjusts a magnitude of a current applied to the lamp section according to a resistance value of the silver-plated detector in the detection section, further according to whether the normal lighting circuit or emergency lighting circuit is powering the lamp section.

According to another aspect of the present invention, the power section current regulator may adjust the magnitude of the current applied to the power section corresponding to the resistance value of the silver-plated detector, further according to normal conditions times in which the normal lighting circuit powers the power section, and in an emergency in which the emergency lighting circuit powers the power section. In this way, the luminaire can be used with a different standard for average brightness of the entire display surface in both normal conditions and in an emergency.

According to the first aspect of the present invention, the luminous flux deterioration of the lamp is compensated by causing the power supplied from the power section to increase when the raise in the resistance value is detected at the silver-plated detector.

BRIEF DESCRIPTION OF THE SEVERAL VIEWS OF THE DRAWINGS

FIG. 1b is a schematic cross sectional view of an LED lamp as used in the luminaire embodiment of FIG. 1a.

DETAILED DESCRIPTION OF THE INVENTION

Figure 1A:
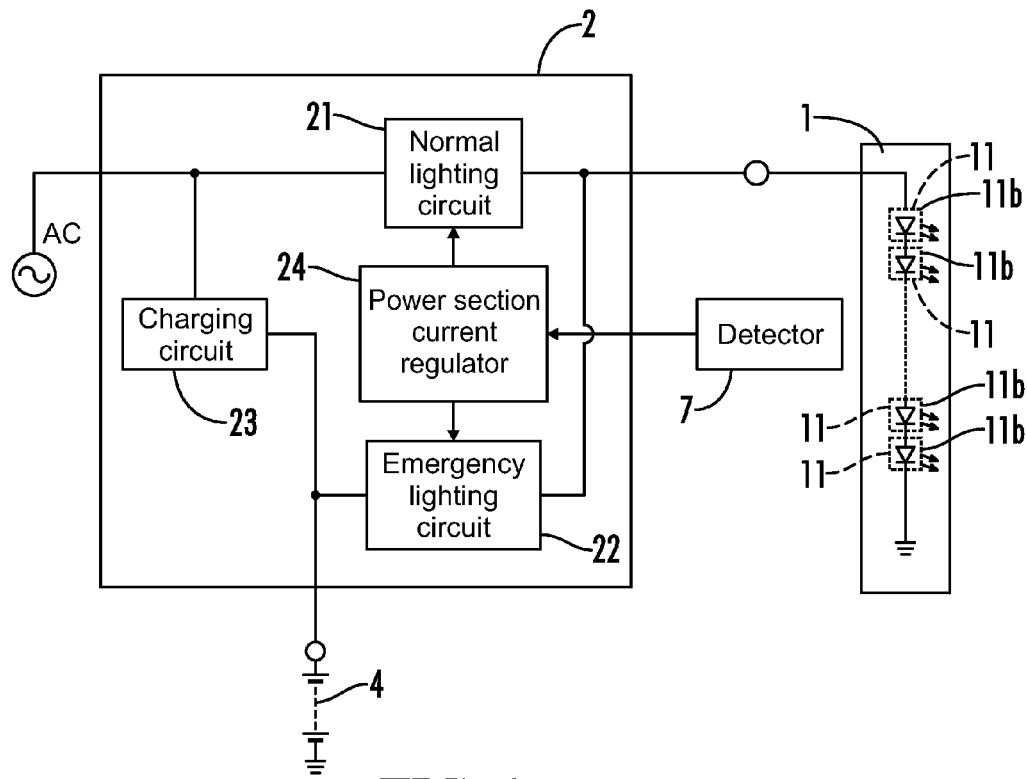
FIG. 1a is a circuit block diagram of one embodiment of a luminaire in accordance with the present invention.
Figure 2:
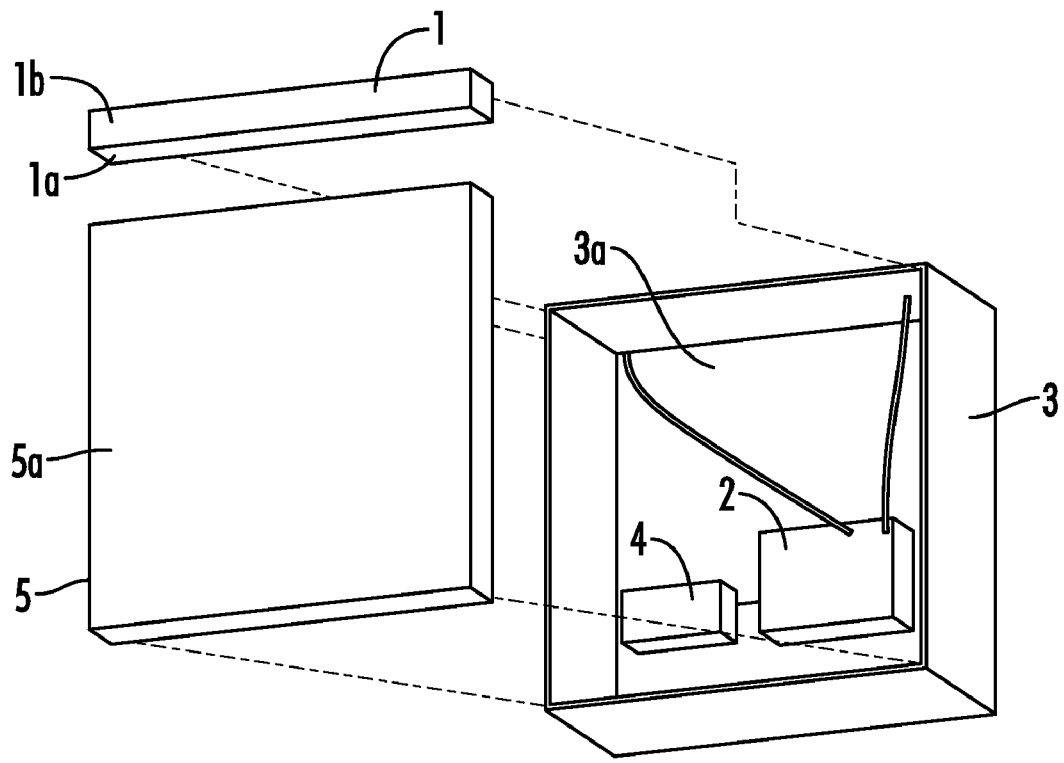
FIG. 2 is an exploded perspective view of one embodiment of the luminaire of the present invention.

Referring to FIGS. 1a and 2, one embodiment of the luminaire of the present invention is an emergency guide light provided with a lamp section 1 including a plurality of lamps 11, a power section 2 which receives power supplied from a commercial power source AC to power the lamp section 1, and a fixture main body 3 accommodating the power section 2 therein. The fixture main body 3 also accommodates a back-up battery section 4 capable of powering the power section 2 when the power supplied from the commercial power source AC to the power section 2 is shut off due to, for example, a power outage.

As shown in FIG. 2, the fixture main body 3 is formed into a rectangular box shape having an opening 3a on a front side. The fixture main body 3 also includes a display panel 5 arranged on a front side thereof which covers a part of the opening 3a as well as allows light emitted from the lamp section 1 to exit from a display surface 5a. Furthermore, the luminaire of the present embodiment may include a rectangular light guide plate (not shown), whose peripheral shape is formed in the approximately same shape as the display panel 5, and is placed on an opposite side of the display surface 5a of the display panel 5.

A reflection sheet (not shown) may be placed on a side opposite to the display panel 5 side in the case of the light guide plate, so that light entering from a top end surface of the light guide plate exits to the display panel 5 side directly or after reflecting off the reflection sheet.

The lamp section 1 is provided with an elongated rectangular lamp enclosure 1b in which a transparent surface or lens 1a is formed on one surface thereof (the lower surface in FIG. 2). A plurality of lamps 11 are positioned along a longitudinal direction of the lamp enclosure 1b. The light emitted from the lamp 11 exits from the lens 1a. Here, the lamp enclosure 1b may be attached to cover a portion of the opening 3a of the fixture main body 3 that is not covered with the display panel 5, and is placed so that the lens 1a is opposed to the top end surface of the light guide plate.

Figure 1B:
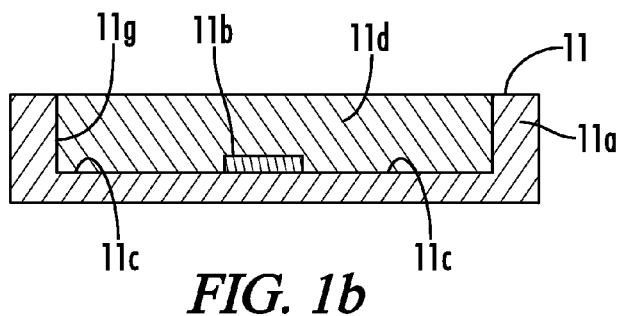

As shown in FIG. 1(b), each lamp 11 is provided with a box-shaped lamp package 11a including a concave portion 11g that has a generally circular shape (in plan view). An LED chip 11b is die-bonded by means of, for example, solder to one of a pair of electrode pads (not shown) exposed to an inner bottom surface of the concave portion 11g, as well as electrically connected to the other electrode pad via a bonding wire. A reflector section 11c made of a silver film is formed in a portion on an inner bottom surface of the concave portion 11g that is not covered with the electrode pad and the LED chip 11b. A translucent resin layer 11d made of a silicone resin is filled in the concave portion 11g. More specifically, the LED chip 11b is arranged inside of the package 11a of the lamp 11, and the reflector section 11c made of a silver film is formed around the LED chip 11b.

In one embodiment, an LED chip utilizing a GaN compound semiconductor may be used as the LED chip 11b. In addition, the translucent resin layer 11d is formed by a silicone resin containing a fluorescent material. In this embodiment, a blue LED chip made of the GaN compound semiconductor may be used as the LED chips 11b. A yellow phosphor is used as the fluorescent material so that the lamp 11 can emit white light. In the present embodiment, the reflector section 11c may be made of silver or a silver alloy.

As shown in FIG. 1(a), the power section 2 is provided with a normal lighting circuit 21 that receives the power supplied from the commercial power source AC in normal operating conditions to provide power to lamp section 1. An emergency lighting circuit 22 may also be provided to supply power for the lamp section 1 under an emergency condition such as a power outage such that power to the normal lighting circuit 21 is shut off.

A power section current regulator 24 may be included that causes the magnitude of a current supplied from the normal lighting circuit 21 and the emergency lighting circuit 22 to the lamp section 1 to increase when an increase in a resistance value is detected at a silver-plated detector 7a in detector section 7. A charging circuit 23 receives the power supplied from the commercial power source AC to charge the battery back-up battery section 4.

A diagram (not shown) may be formed on the display surface 5a of the display panel 5 to give evacuees direction or instructions for an escape route toward an emergency exit.

Figure 1C:
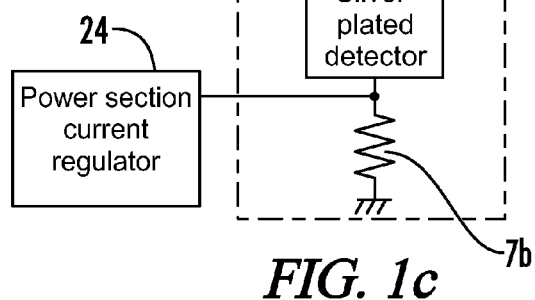
FIG. 1c is a circuit block diagram of the detector section and power section current regulator as used in the embodiment of FIGS. 1 and 2.

In the luminaire of the present embodiment, to measure sulfidity of a surface of the reflector section 11c, the detector section 7 includes a silver-plated detector 7a. The detector 7a is connected to a constant voltage source Vc at one end and is grounded at the other end via a resistance 7b. The detector 7a is positioned outside of the power section 2 within the fixture main body 3, as shown in FIG. 1(c).

The power section current regulator 24 is connected at a connection point between the series connection of the silver-plated detector 7a and the resistance 7b. In addition, although in the present embodiment the detector section 7 is positioned outside of the power section 2, the invention is not limited to this arrangement. The detector section 7 may be placed, for example, within the lamp section 1 or within the power section 2. Moreover, as the constant voltage source Vc, a power source circuit, a battery or other device can be used which rectifies the output of the commercial power source AC and outputs a DC voltage.

Research regarding the sulfuration of a surface of a silver-plated detector has been conducted by others for the general case ("Research on Effect of Packaging Material on Products", Hiroko Inoki and three others, ESPEC Technique Information, No 16, Technique Report) In the research, a silver-plated detector for testing (not shown) was formed with a size of 50 mm long, 20 mm wide and 0.2 mm thick and was placed in a glass vessel (not shown) of 900 cc in volume. A piece of corrugated cardboard (not shown) was used as a source of hydrogen sulfide gas, and which was left under temperature environment of 40° C. and 80° C. with the glass vessel kept airtight. The silver-plated detector was removed to undergo visual inspection of the surface of the silver-plated detector for testing, an elemental analysis by EPMA (Electron Probe Micro Analyzer), and a contact resistance measurement.

The finding from the visual inspection is that the longer the silver-plated detector is left, the more the discoloration of the silver-plated detector occurs significantly under either temperature environments. Further, from the elemental analysis by EPMA, the more the silver-plated detector discolors significantly, the more the sulfur content (sulfidity) in the surface thereof increases. Furthermore, from the contact resistance measurement, the contact resistance value is about 10 mΩ before sulfuration, while the contact resistance values increases to approximately 10Ω as the silver-plated detector is left for an extended period. Thus the sulfidity increases on the surface thereof. As a result, the research by visual inspection, by the elemental analysis by EPMA, and by the contact resistance measurement described above yields the result that the more the silver-plated detector discolors significantly, the greater the sulfidity occurs on the surface of the silver-plated detector, thereby raising the contact resistance value.

In the present embodiment, a change in a resistance value of the silver-plated detector 7a is detected to indirectly measure the sulfidity of the surface of the reflector section 11c (also made of silver), based on the above-mentioned research results. The power section current regulator 24 may include, for example, a microcomputer. It controls and causes the normal lighting circuit 21 or the emergency lighting circuit 22 to change the magnitude of the current to be applied to the lamp section 1. The adjustment corresponds to a voltage across the resistance 7b when a constant voltage is applied to a series circuit including the silver-plated detector 7a and the resistance 7b. As a method for changing a magnitude of a current applied to the lamp section 1, the duty cycle of the current applied to the lamp section 1 may be changed or the magnitude of the voltage applied to the lamp section 1.

Figure 3:
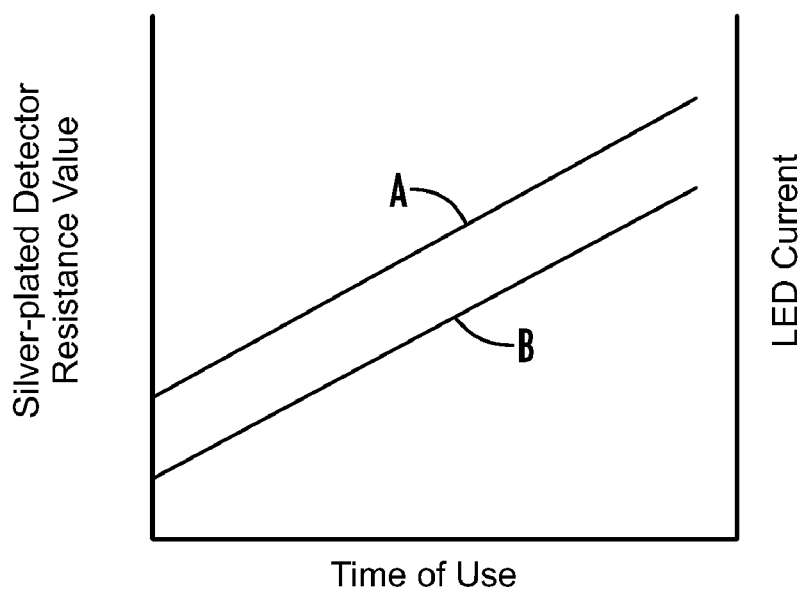
FIG. 3 graphically illustrates one mode of operation of the luminaire of the present invention.

The lamp 11 has a reflector section 11c made of silver as described above. The sulfuration of the surface of the reflector section 11c blackens the surface and causes the luminous flux deterioration of the lamp. Therefore, as the resistance value of the silver-plated detector 7a (the silver-plated detector resistance value) increases with lamp use as shown in FIG. 3 (A), the current (the LED current) applied to the lamps 11 in lamp section 1 is increased, taking into account the difference in sulfidity between the silver-plated detector 7a and the surface of the reflector section 11c of the lamp 11. This enables compensation of the luminous flux deterioration due to the sulfuration of the surface of the reflector section 11c. Consequently, it is possible to limit or prevent degradation of the luminous flux of the luminaire. In addition, the magnitude of the power supplied to the lamp section 1 is adjusted at the power section current regulator 24 arranged within the power section 2.

When the luminaire of the present embodiment is used as a guide light, it is not required to consider the luminous flux deterioration due to the sulfuration of the surface of the reflector section 11c of the lamp 11 at the time of setting the initial value of the average brightness of the entire display surface 5a of the display panel 5. Therefore, using the luminaire of the present embodiment as, for example, a guide light of Class B Type BH of JIL5502 merely requires the consideration of approximately 30% of the luminous flux deterioration due to the degradation of the translucent resin layer 11d. Considering that a lower limit value of JIL5502 is 500 cd/m², it may be efficient to set an initial value of the average brightness to $500/(1-0.3)=714$ cd/m². Consequently, the average brightness is kept within a range from 500 cd/m² to 800 cd/m², which satisfies JIL5502, from the beginning of use to the end of life of the lamp 11.

Standard JIL5502 defines the various standards for the average brightness in both normal conditions and in an emergency as the range that the average brightness should satisfy. In contrast, in the luminaire of the present embodiment, the power section current regulator 24 adjusts the magnitude of the current applied to the lamp section 1 separately in normal conditions in which the normal lighting circuit 21 powers the lamp section 1, and in an emergency in which the emergency lighting circuit 22 powers the lamp section 1. Therefore, the luminaire of the present embodiment can be used as a guide light in which the standards for the average brightness of the display surface 5a varies in both normal conditions and in an emergency, as described above.

Figure 4:
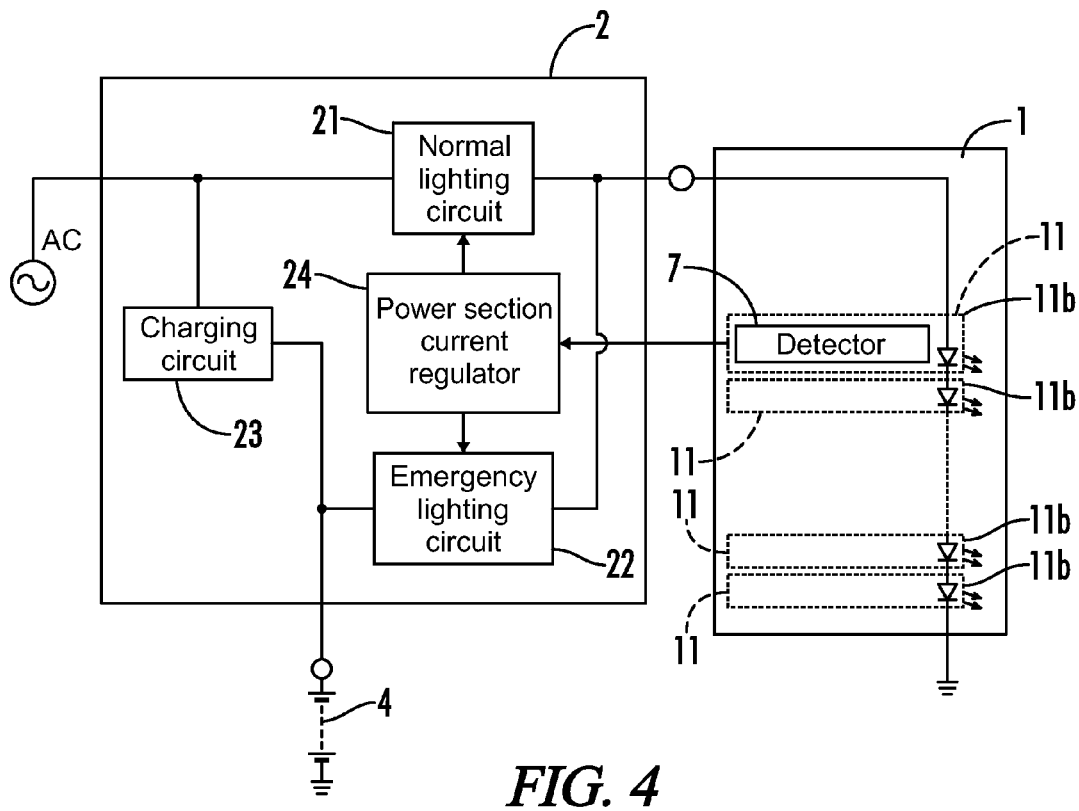
FIG. 4 is a circuit block diagram of a second embodiment of the luminaire of the present invention.

A basic configuration of a luminaire embodiment used as a guide light is approximately same as that of the first embodiment. The difference is that the silver-plated detector 7a is manufactured in a size capable of being placed within the package 11a of each lamp 11, or at least one package 11a out of a plurality of lamps 11. Two detection terminals (not shown) are connected to the silver-plated detector 7a and located outside of the package 11a of the lamp 11 within which the silver-plated detector 7a is placed. The silver-plated detector 7a to which two detection terminals (not shown) are connected may be placed around the LED chip 11b for reflecting light from the LED chip 11, as shown in FIGS. 4 and 5.

The silver-plated detector 7a may also perform a reflection function for reflecting the light from the LED chip 11b and may be placed at the bottom of a concave portion 11g of the package 11a except in a region where the LED chip 11b is placed.

Figure 5:
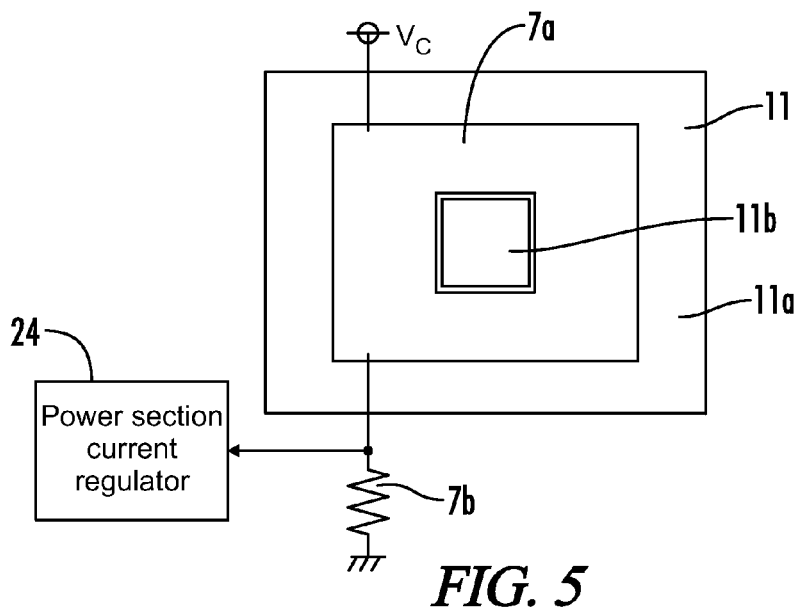
FIG. 5 is a block diagram of the luminaire embodiment of FIG. 4.
Figure 6A:
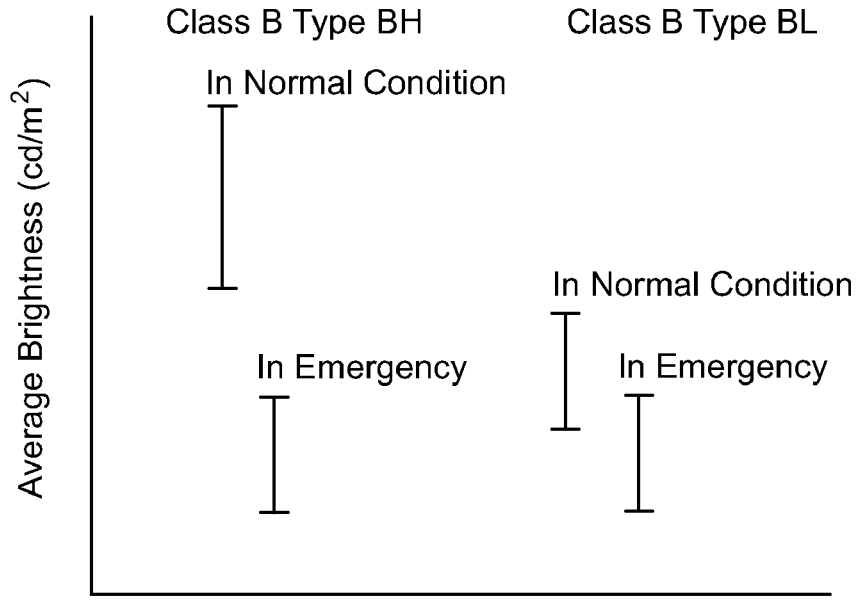
FIG. 6(a) shows a standard for average brightness on a display surface of an escape exit guide for a guide luminaire and escape guide system.
Figure 6B:
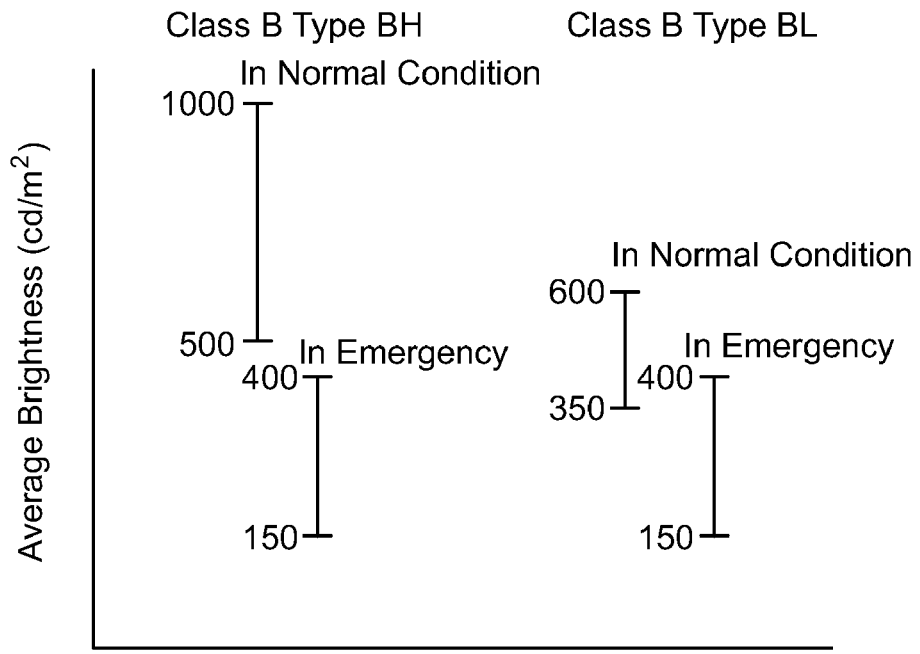
FIG. 6(b) shows a standard for average brightness on a display surface of a route guide light for a guide luminaire and escape guide system.
Figure 7:
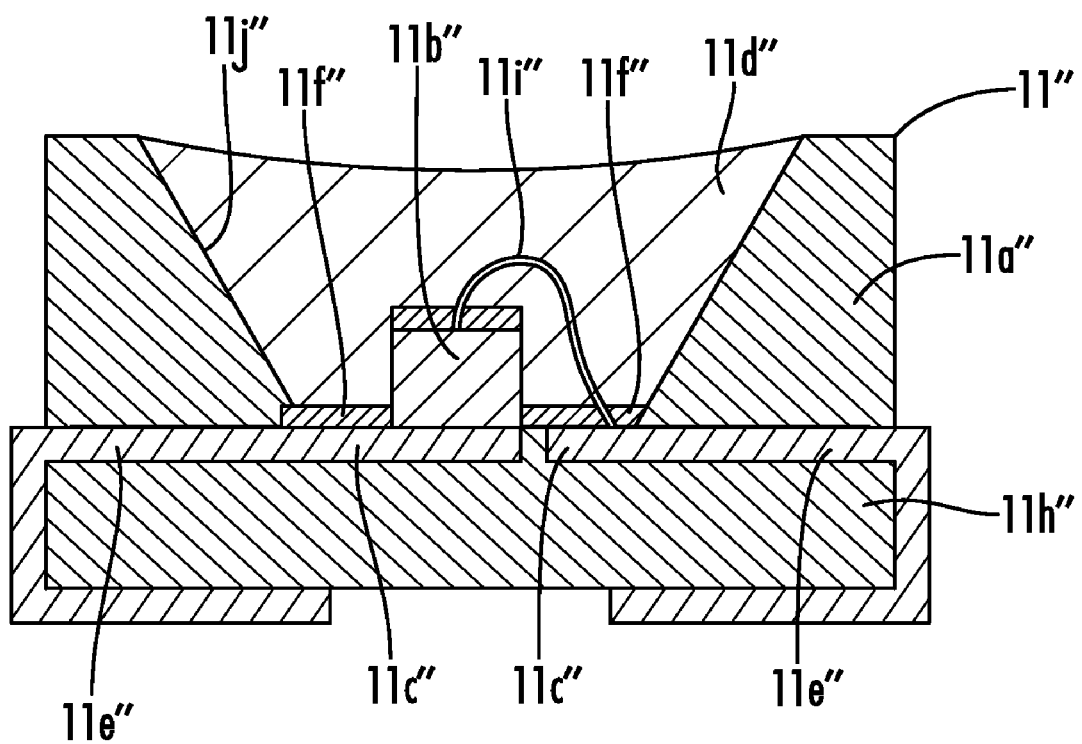
FIG. 7 shows a schematic cross sectional view of a conventional luminaire.

The silver-plated detector 7a also connected to the constant voltage source Vc via one of two detection terminals, and to an end of the resistance 7b via the other detection terminal, as shown in FIG. 5. The other end of the resistance 7b is grounded. Then, the power section current regulator 24 is connected at a connection point between the other detection terminal and the resistance 7b.

Consequently, a difference in sulfidity is reduced between the silver-plated detector 7a and the surface of the reflector section 11c of the lamp 11, thereby enabling the luminance flux deterioration of the lamp 11 to be compensated more accurately. Further, the silver-plated detector 7b placed within the lamp 11 eliminates the need for an attachment member for attaching the silver-plated detector 7b to the fixture main body 3 of the luminaire. Therefore, the material cost can be reduced because of reduction in component count. It is also possible to save the labor of attaching the silver-plated detector 7b to the fixture main body 3 of the luminaire.

The difference in sulfidity between the silver-plated detector 7a and the surface of the reflector section 11c of the lamp 11 is diminished, thereby enabling the luminance flux deterioration of the lamp 11 to be compensated more accurately. In addition, since the silver-plated detector 7a has a reflection function for reflecting the light from the LED chip 11b, and is placed at the bottom of a concave portion 11g of the package 11a except a region where the LED chip 11b is placed, the efficiency of emitting light from the lamp 11 can be improved. Therefore, it is possible to enhance energy savings.

In addition, although the present embodiment describes the luminaire used as a guide light or emergency, it may be used in other lighting applications.

Thus, although there have been described particular embodiments of the present invention of a new and useful LED luminaire with automatic luminance compensation, it is not intended that such references be construed as limitations upon the scope of this invention except as set forth in the following claims.

What is claimed is:
1. An luminaire, comprising:
  a lamp section comprising a least one LED lamp, the LED lamp having an LED chip and a reflector section, the reflector section comprising silver positioned to reflect light from the LED chip;
  a power section coupled to supply power to the lamp section;
  a detector section comprising a silver-plated detector and functional to detect sulfuration of the reflector section as a resistance value change; and the power section is operable to adjust the power supplied to the lamp section upon detecting an increase in the resistance value at the silver-plated detector of the detector section.

2. The luminaire according to claim 1, wherein:
the silver-plated detector is located inside at least one the lamp; and
two detection terminals connected to the silver-plated detector are provided in the at least one lamp.

3. The luminaire according to claim 2, wherein the silver-plated detector is positioned to reflect light from the LED chip.

4. The luminaire according to any one of claims 1 to 3, comprising:
a display panel having a display surface and positioned to allow light emitted from the lamp section to exit from the display surface;
a back-up battery section capable of supplying power to the power section;
the power section further comprises
a normal lighting circuit coupled to receive power from a commercial power source to power the lamp section,
an emergency lighting circuit coupled to receive power from the battery back-up section and functional to power the lamp section during a commercial power outage,
a power section current regulator coupled to control the normal lighting circuit and the emergency lighting circuit and functional to cause a magnitude of a current supplied from the normal lighting circuit and the emergency lighting circuit to the power section, and
a charging circuit coupled to receive power supplied from the commercial power source to charge the battery back-up section; and
wherein the power section current regulator adjusts the magnitude of the current applied to the power section corresponding to the resistance value of the silver-plated detector when powering the lamp section from the normal lighting circuit, and when powering the lamp section from the emergency lighting circuit.

* * * * *